(12) United States Patent
Vickroy (10) Patent No.: US 7,793,672 B2
(45) Date of Patent: Sep. 14, 2010

(54) APPARATUS AND METHOD FOR REMOVING DEBRIS FROM A TOOL

(75) Inventor: Samuel C. Vickroy, Madison, AL (US)

(73) Assignee: SCV Quality Solutions, LLC, Madison, AL (US)

( * ) Notice: Subject to any disclaimer, the term of this patent is extended or adjusted under 35 U.S.C. 154(b) by 924 days.

(21) Appl. No.: 11/510,072

(22) Filed: Aug. 25, 2006

(65) Prior Publication Data

US 2007/0044818 A1     Mar. 1, 2007

Related U.S. Application Data

(60) Provisional application No. 60/711,220, filed on Aug. 25, 2005.

(51) Int. Cl.
*B08B 3/00* (2006.01)
*A47L 13/02* (2006.01)

(52) U.S. Cl. .................................. 134/198; 15/236.01

(58) Field of Classification Search ................. 134/900, 134/6, 34, 32, 198, 201; 15/104.04, 40, 210.1, 15/244.1, 220.4, 404.04, 211, 245, 256.6, 15/104.92, 160, 74, 77, 102, 21 B See application file for complete search history.

(56) References Cited

U.S. PATENT DOCUMENTS

| | | | | |
|---|---|---|---|---|
| 3,731,697 A | * | 5/1973 | Yost | 134/138 |
| 4,502,175 A | * | 3/1985 | Hillis | 15/104.92 |
| 5,184,637 A | * | 2/1993 | Kowis | 134/182 |
| 5,881,419 A | * | 3/1999 | Millard | 15/104.04 |

\* cited by examiner

*Primary Examiner*—Michael Kornakov
*Assistant Examiner*—Stephen Ko
(74) *Attorney, Agent, or Firm*—Lanier Ford Shaver & Payne, P.C.; Ann I. Dennen (57) ABSTRACT

An apparatus in accordance with an exemplary embodiment of the present disclosure has frame and a debris removal opening within the frame. The frame is secured to the ground by driving a blunt point of the frame into the ground. Further, the apparatus comprises a faucet positioned above the debris removal opening. Thus, a user may turn the faucet on to begin water flow and insert a garden tool into the opening. As the user inserts and/or removes the garden tool from the opening, the apparatus removes unwanted debris, e.g., mud, gravel, grass, etc., that is attached to the garden tool and washes the tool with the water.

14 Claims, 13 Drawing Sheets

APPARATUS AND METHOD FOR REMOVING DEBRIS FROM A TOOL

CROSS REFERENCE TO RELATED APPLICATION

This application claims priority to U.S. Provisional Application No. 60/711,220, entitled "Apparatus and Method for Removing Debris from a Tool," and filed on Aug. 25, 2005, which is incorporated herein be reference.

RELATED ART

Tools are used in landscaping and gardening for a variety of functions. Specifically, tools such as shovels, hoes, picks, and trowels are used to loosen ground and/or move dirt from one place to another.

In the course of using such tools to landscape and/or garden, debris, e.g., mud or rocks, may become affixed to the tools. In order to use the tools most effectively, it is oftentimes imperative to remove the debris from the tools before continuing with gardening and/or landscaping chores.

One who is using a tool can use his foot to knock the debris off of the tool. Furthermore, he can knock the tool against a stationary object, e.g., a fence or a rock, to remove the debris.

However, such methods of removing debris from gardening tools are usually inefficient and oftentimes ineffective.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to apparatuses and methods for removing debris from a garden tool. Particularly, an apparatus in accordance with an exemplary embodiment of the present disclosure has a frame and a debris removal opening within the frame. The frame is secured to the ground by driving a blunt point of the frame into the ground. Further, the apparatus comprises a faucet positioned above the debris removal opening. Thus, a user may turn the faucet on to begin water flow and insert a garden tool into the opening. As the user inserts and/or removes the garden tool from the opening, the apparatus removes unwanted debris, e.g., mud, gravel, grass, etc., that is attached to the garden tool and washes the tool with the water.

Figure 1:
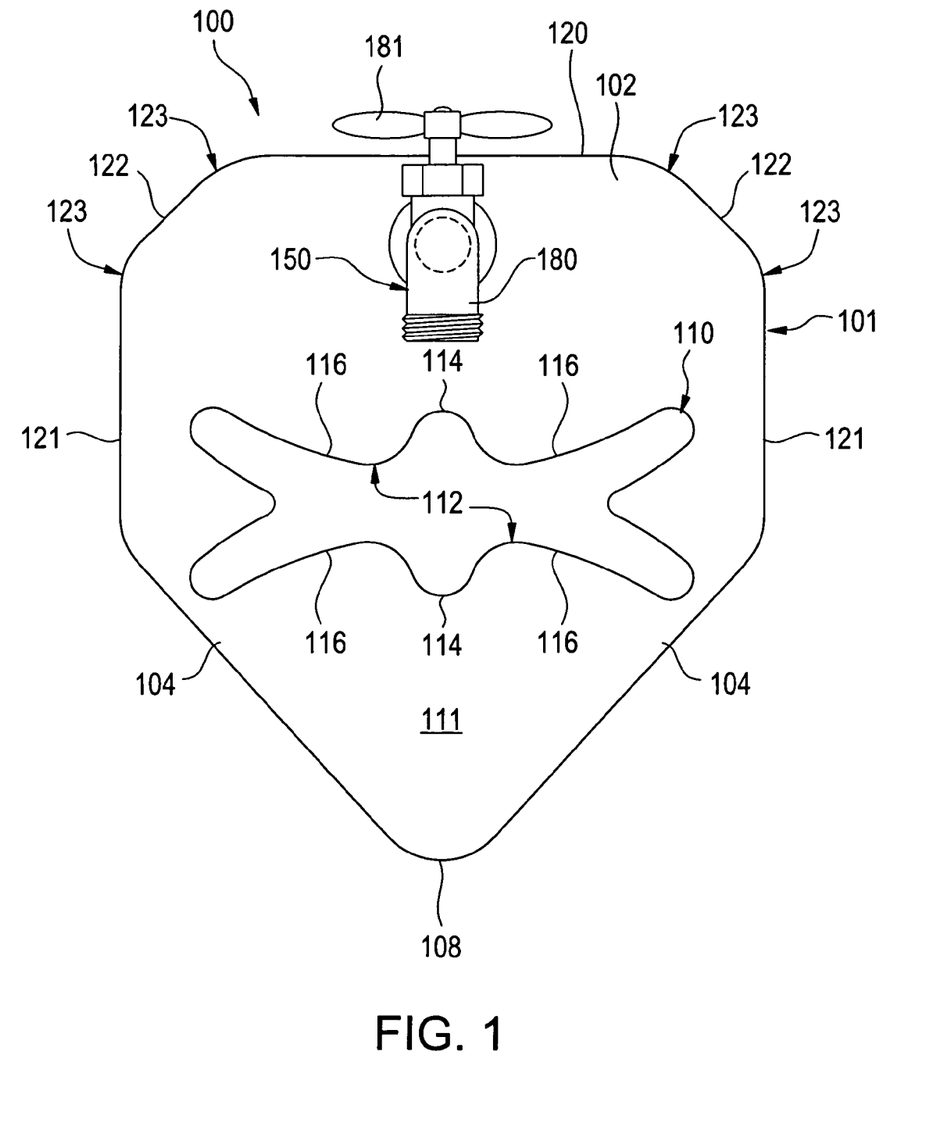
FIG. 1 depicts a tool scraper in accordance with an exemplary embodiment of the present disclosure.

A garden tool scraper 100 in accordance with an exemplary embodiment of the present disclosure is depicted in FIG. 1. The tool scraper 100 comprises a frame 101 having a tool scraper head 102, a tapered body 104, and a blunt point 108, although it is possible for the point 108 to be sharp in other embodiments. The tool scraper 100 further comprises a spout 180. The spout 180 is further attached to an actuator, and an exemplary actuator as illustrated in FIG. 1 is a turn-handle 181.

In one embodiment, the frame 101 is in the shape of a geometrical plate, although other shapes of the frame 101 may be used in other embodiments. The frame 101 is composed of a rigid material, such as plastic, although other types of materials may be is used in other embodiments. Further, the tapered body 104 and blunt point 108 facilitate insertion of the scraper 100 into the ground or a structure (not shown).

The tool scraper 100 has a tool-shaped opening 110 for receiving a garden tool that may be adulterated with unwanted debris, such as mud. The opening has a shape corresponding to a cross-sectional shape of the tool to be inserted into the opening 110 such that the scraper 100 can contact. The exemplary tool-shaped opening 110 is particularly shaped for receiving, for example, a shovel blade, described in more detail with reference to FIG. 2. However, other tool-shaped openings shaped to receive other tools, e.g., spades, trowels, hoes, or rakes, are possible in other embodiments. Furthermore, the tool-shaped opening is shaped such that a tool can be inserted with a blade of the tool (not shown) in various positions, as described further herein.

Figure 2:
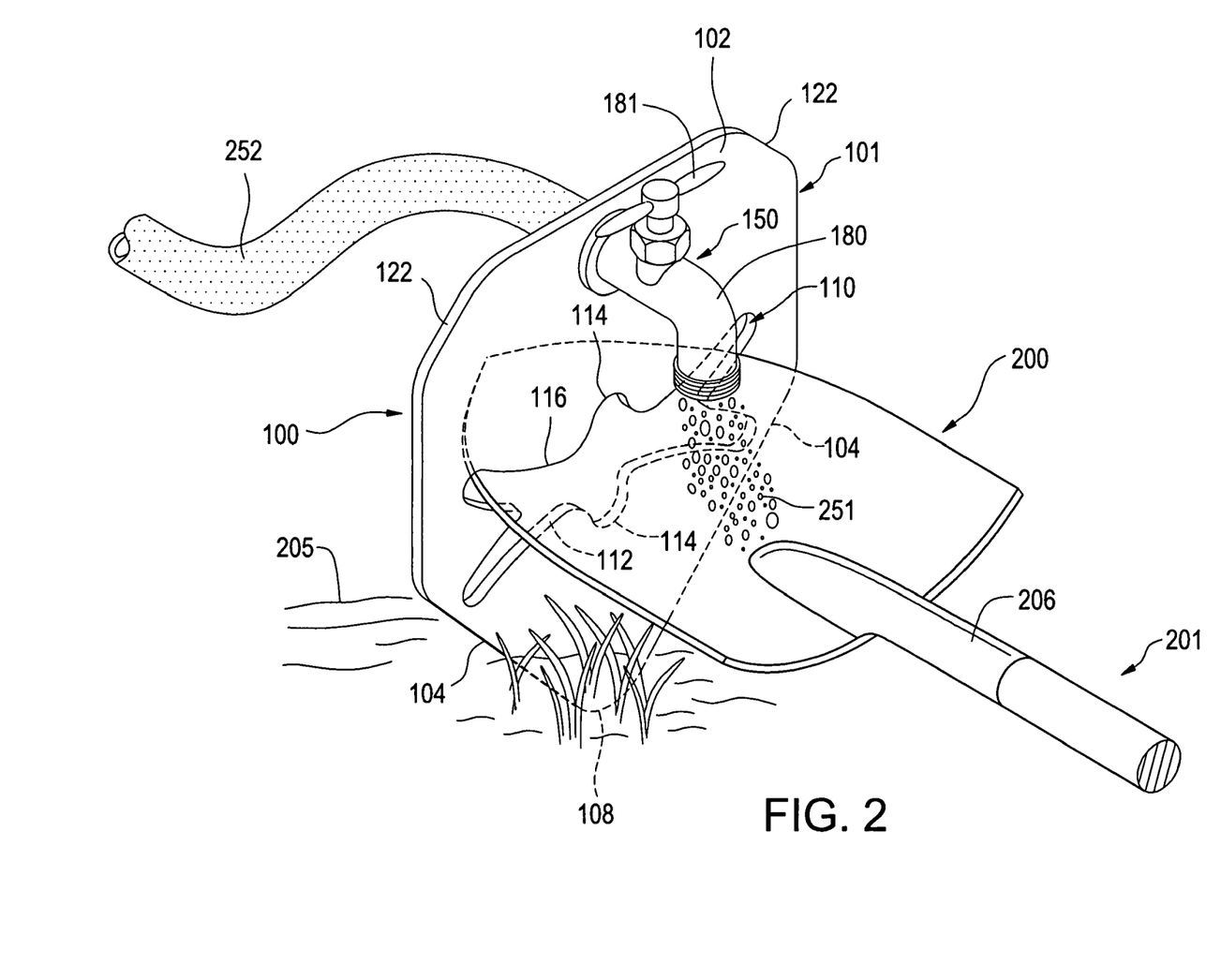
FIG. 2 depicts the tool scraper of FIG. 1 receiving a garden tool.

In this regard, the tool-shaped opening 110 is defined by, four symmetrical lips 116 and two symmetrical notches 114. The edge of each notch 114 is contiguous with the edges of a respective pair of lips 116, and each notch 114 is interposed between at a respective pair of lips 116. In one embodiment, the direction of curvature of the notches 114 is opposite the direction of curvature of the symmetrical lips 116 between which each notch 114 is situated. In this regard, a tool can be inserted into the opening 110 in various positions, such as right-side up or right-side down. Notably, a tool is positioned "right side up" when it is positioned in the opening 110 in the position that the tool would be placed when used in its ordinary manner. For example, if the tool 201 is a shovel, right-side up may refer to the position in which the shovel would be held to dig such that the shovel is inserted through the opening 110 as depicted in FIG. 2. A right-side down position may refer to the position in which the shovel is inverted relative to its position in FIG. 2.

As will be described with reference to FIG. 2, the lips 116, and the notches 114 combine to form a shape conducive to receiving a shovel blade 200, for example, in a right-side up position or right-side down position.

Additionally, the opening 110 is defined by an inner wall 112 of the frame 101. The portions of the inner wall 112 may be pressed against a surface of the shovel blade 200 as the blade 200 is inserted into and/or removed from the frame 101. In this regard, the shape of the opening 110 having the lips 116 and the notches 114 is such that, when a shovel blade (not shown) is inserted into and/or retrieved from the opening 110 while being pressed against the inner wall 112, the frame 101 can scrape a significant amount of debris from the shovel blade 200. In this regard, the tool-shaped opening 110 can receive different styles of shovel blades that are of different sizes. Note that at least some debris may be scraped from the blade 200 even though the inner wall 112 is not pressed against a surface of the blade 200, although pressing the blade 200 against the inner wall 112 can result in more effective scraping.

The body 104 tapers to a blunt point 108. The blunt point 108 is configured for insertion into the ground. Therefore, when the blunt point 108 is inserted into the ground, and force is applied to the head 102, the scraper 100 inserts securely into the ground. The frame 101 is then used to scrape debris from a garden tool being passed through the opening 110 while the scraper 100 remains securely in the ground.

FIG. 2 depicts the scraper 100 inserted into the ground 205 such that portions of the tapered body 104 and the head 102 are exposed but the blunt point 108 is buried. Further, FIG. 2 depicts a shovel blade 200 inserted into the opening 110. The shovel blade 200 is inserted into the opening 110 and the opening 110 is shaped such that the curvature of the blade 200 substantially matches that of the lips 116 defining at least part of the opening 116 thereby allowing the blade 200 to fit snugly against the lips 116. Note that the notches 114 allow a blade stem 206 to pass therethrough in the event that the blade 200 is inserted far enough into the opening 110. Furthermore, FIG. 2 depicts the faucet 150 emitting, onto the blade 200, a liquid, such as water 251, provided by a hose 252 connected to the faucet 150, which is described further herein with reference to FIG. 3.

Indeed, the shape of the opening 110 corresponds to the shape of the blade 200 such that a substantial upper-side portion of the blade 200 contacts the inner wall 112 if the upper portion of the blade 200 is pushed against the lips 116. Likewise, underside portions of the blade 200 contact the inner wall 112 if the underside portion of the blade 200 is pushed against the frame 101. Furthermore, the opening 110 corresponds to the shape of the blade 200 if the blade 200 were inserted into the opening 110 right-side down, as described hereinabove. In this regard, in FIG. 2, the blade is shown as being inserted into two lips 116, referred to as "upper lips 116." When the blade 200 is inserted into the opening 110 right-side down, the blade may be inserted into the other two lips 116, referred to as "lower lips 116."

Moreover, as the blade 200 is being pulled and/or pushed through the opening 110, whether the blade 200 is inserted into the opening right-side up or right-side down, debris on the blade 200 contacts the inner wall 112 and/or a face (e.g., a front face 111 or a back face 112 (FIG. 3)) of the frame 101 causing any unwanted debris to be scraped from the blade 200. Further, the water 251, as it rains down from the spout 180, further cleanses the blade 200 and/or softens the debris so that it is more conducive to being scraped.

The turn handle 181 can be actuated to a first position such that the water 251 flows from the spout 180, as illustrated. Likewise, the turn handle 181 can be actuated to a second position such that the water 251 no longer flows from the spout 180. The design of the turn handle 181 and spout 180 can be similar to designs of turn handles and spouts of conventional faucets.

Figure 3:
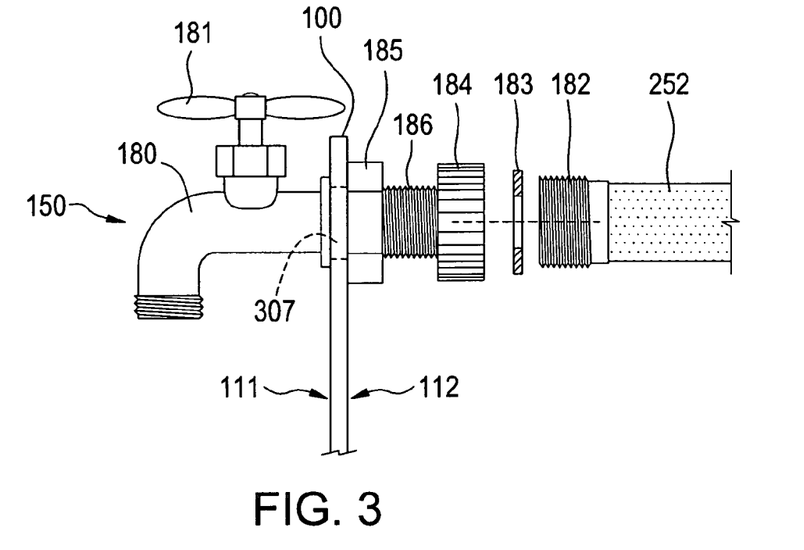
FIG. 3 depicts a side view of an exemplary embodiment of a tool scraper, such as is depicted in FIG. 1.

FIG. 3 depicts a side view of an exemplary faucet 150 of the present disclosure. The faucet 150 comprises the spout 180 and the turn handle 181, as described hereinabove.

The faucet 150 further comprises a threaded extension 186 that is inserted through an opening 307 in the shovel scraper 100. A nut 185 is threadedly attached to the threaded extension 186 such that the faucet 150 is rigidly and securely attached to the scraper 100.

Furthermore, a hose connector 184 is threadedly attached to the extension 186. Additionally, a threaded end 182 of a hose 252 is inserted into the hose connector 184. The hose 252 is then threadedly connected to the hose connector 104. Furthermore, a rubber washer 183 may be used when connecting the threaded end 182 to the hose connector 184.

Figure 4:
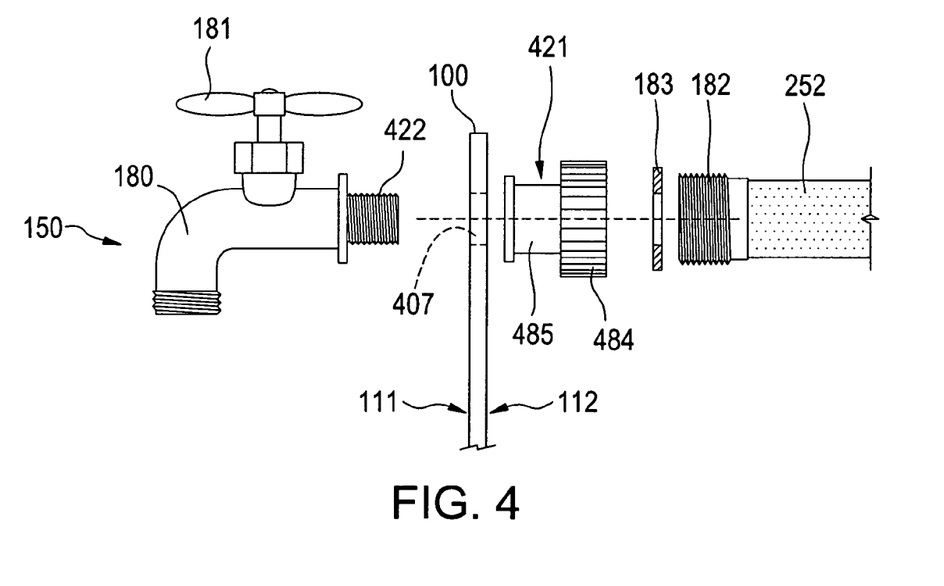
FIG. 4 depicts a side view of an exemplary embodiment of a tool scraper, such as is depicted in FIG. 1.

FIG. 4 depicts a faucet 150 in accordance with another embodiment of the present disclosure. In such an embodiment, the faucet 150 comprises the spout 180 and the turn handle 181, as described hereinabove with reference to FIG. 3. Furthermore, the faucet 150 comprises a threaded extension 422.

The threaded extension 422 is inserted into a hole 407 within the scraper 100. Furthermore, an adapter 421 is threadedly attached to the extension 422. In this regard, the adapter 421 comprises a body 485 and a hose connector 484. The adapter 421 is threadedly connected to the end 422 of the faucet 150 upon insertion through the hole 407.

The hose 252 is threadedly connected to the adapter 421 by threadedly attaching the threaded end 182 of the hose 252 to the hose connector 484 of the adapter 421. Further a rubber washer 182 may be used when connecting the end 182 to the hose connector 484.

Figure 5:
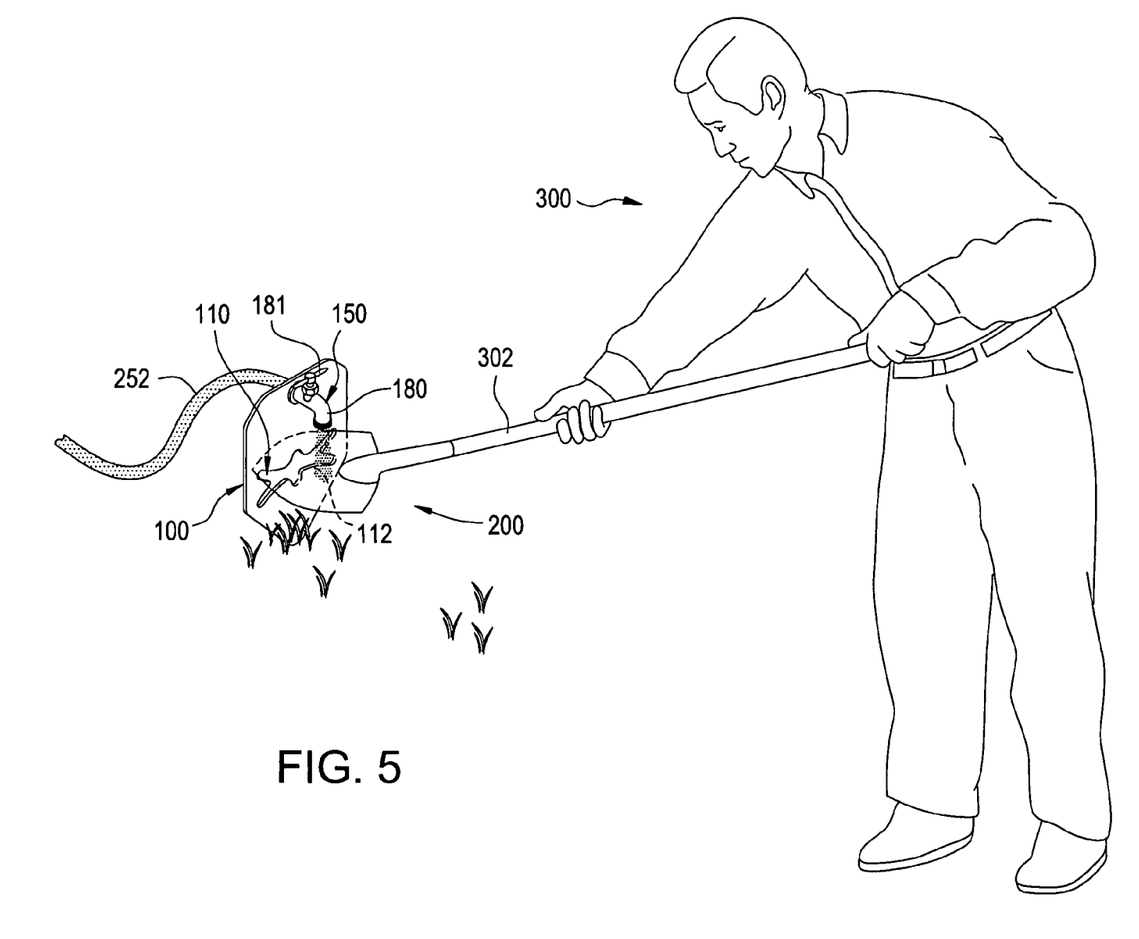
FIG. 5 depicts a user using a tool scraper, such as is depicted in FIG. 1.

FIG. 5 depicts a user 300 inserting the shovel blade 200 into the opening 110. The user 300 inserts the blade 200 via the handle 302 into the opening 110. The user 300 reaches down to the turn handle 181 and actuates the turn handle 181. Upon actuation, the spout 180 directs water 251 onto the blade 200 that is being inserted into the opening 110. The user 300 then moves the blade 200, e.g., lifts the blade 200 or lowers the blade 200, in order to contact the upper-side or underside of the blade 200 with the inner wall 112 defining the opening 110.

Such contact can be made with the inner wall 112 defining the upper portion of the opening 110 comprising the lips 116 (FIG. 2) and the notch 114 with the cupped portion of the blade 200. Alternatively, if there is debris on the underside of the blade 200, the user 300 can move the shovel blade 200 such that the underside of the blade 200 makes contact with the inner wall 112. Furthermore, the user may flip the blade 200 right side down and insert the blade 200 right side down into the opening 110.

Figure 6:
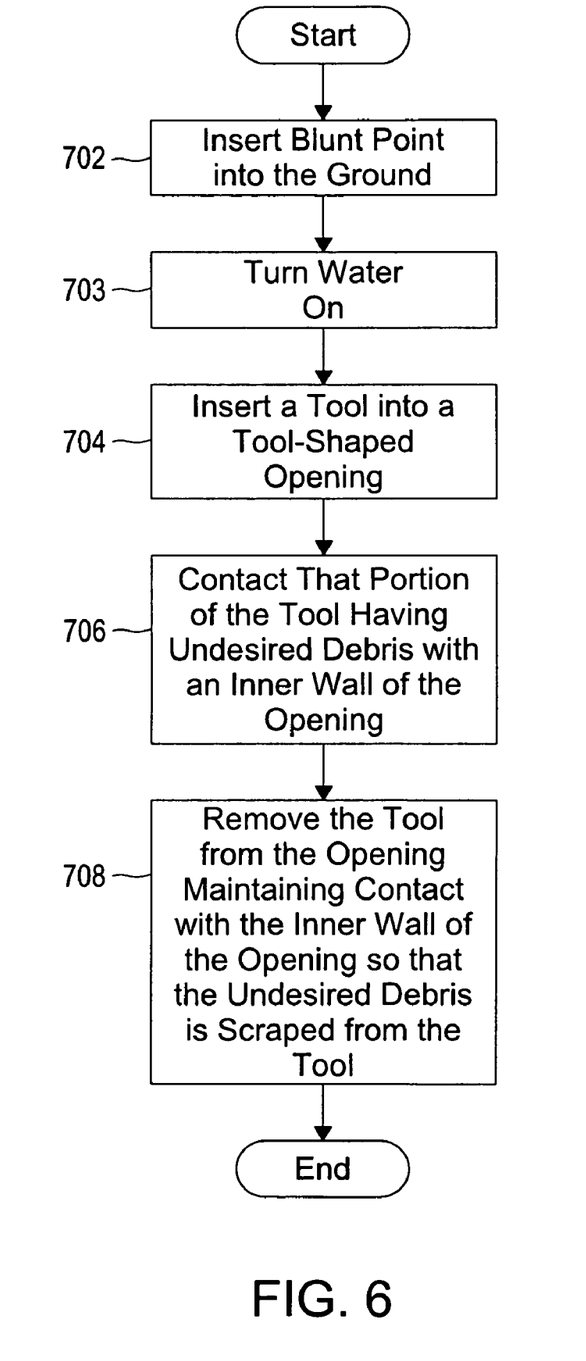
FIG. 6 is a flowchart depicting an exemplary method of using a tool scraper, such as is depicted in FIG. 1.

FIG. 6 is a flowchart depicting a method of removing debris from a tool in accordance with an exemplary embodiment of the present disclosure.

In step 702, the user 300 (FIG. 5) inserts the scraper 100 (FIG. 1) into the ground by placing the blunt point 108 (FIG. 1) into the ground and applying force to the scraper 100.

When the user 300 determines that there is undesired debris on a tool that the user 300 is using, the user turns water on in step 703. In this regard, the user 300 may actuate a turn handle 181 of a faucet 150 such that water 251 spews from a spout 180.

The user 300 then inserts the tool into the tool-shaped opening 110 (FIG. 1) of the scraper 100, in step 704. As noted herein, the tool may be a shovel blade 200 (FIG. 2), and the tool-shaped opening 110 may be shaped to receive and remove debris from the shovel blade 200.

The user 300 makes contact between the blade 200 and the inner wall 112 (FIG. 1) of the opening 110, as indicated in step 706. Such contact may be made by lifting the blade 200 so that the cup of the blade contacts that portion of the inner wall 112 defined by the lips 116 (FIG. 1) and possibly the notch 114 (FIG. 1). Thus, the user may desire to remove debris from the upper-side of the blade 200.

Alternatively, there may be debris on the underside of the blade 200. Therefore, the user may desire to establish contact between the underside of the blade 200 and a portion of the inner wall 112. Such contact may be made by dropping the blade 200 so that the underside of the blade 200 contacts the inner wall 112.

The user 300 then removes the blade 200 from the opening 110 maintaining contact between the blade 200 and the inner wall 112 so that the inner wall 112 and/or a face of the scraper 100 scrapes the unwanted debris from the blade 200 in step 708. Further, the water flowing from the spout 180 contacts the blade 200 and/or debris, further aiding in eliminating the unwanted debris from the shovel.

Figure 7:
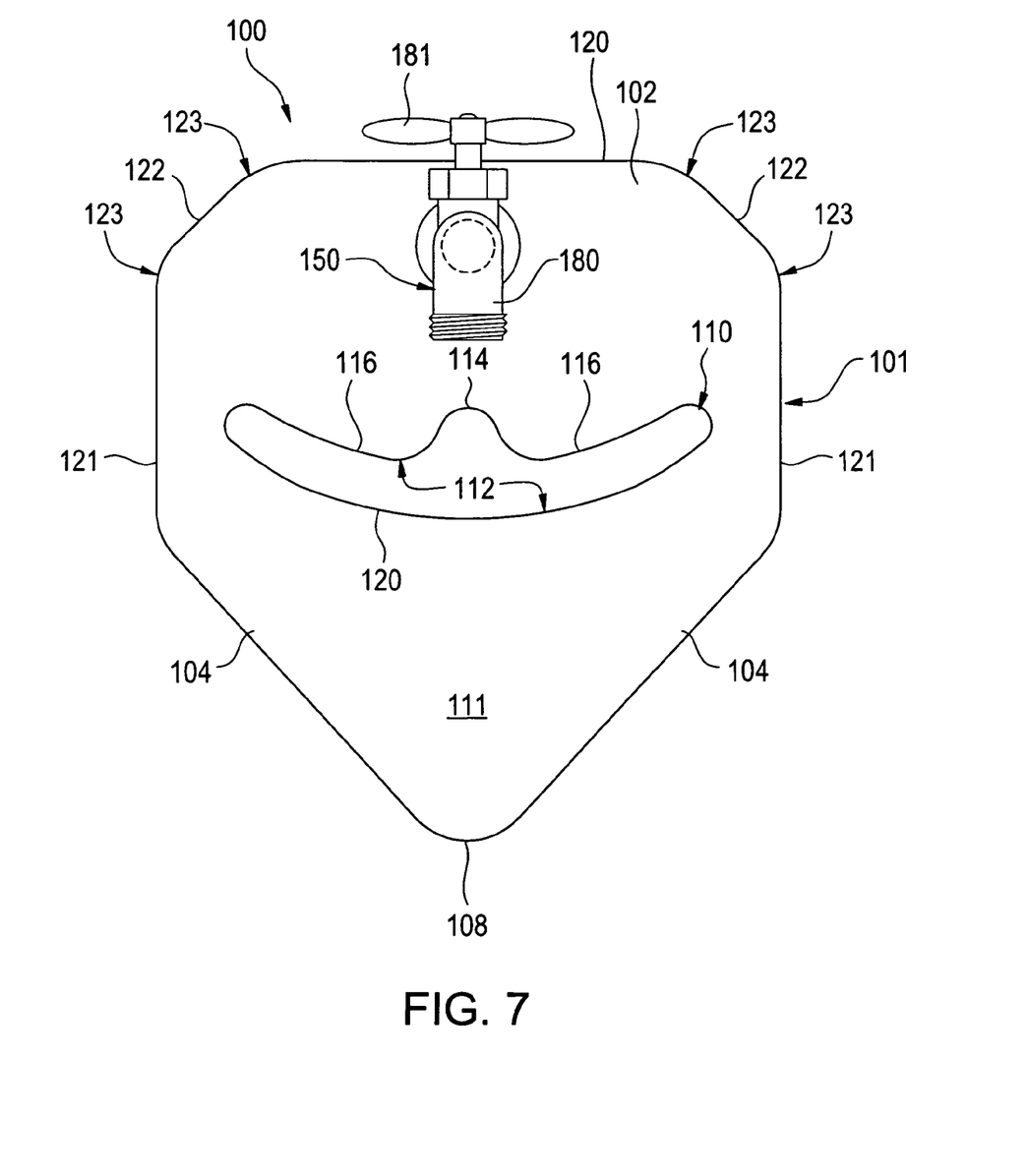
FIG. 7 depicts a tool scraper in accordance with an exemplary embodiment of the present disclosure.

It should be noted that the frame 101 and, in particular, the opening 10 in the frame 101 may have various shapes. U.S. patent application Ser. No. 11/057,800, entitled "Apparatus and Method for Removing Debris from a Tool," and filed on Feb. 14, 2005, which is incorporated herein by reference, describes various possible configurations of the frame 101. FIG. 7 depicts a frame 101 in accordance with an exemplary embodiment of the present disclosure. The frame 101 is identical to that shown by FIG. 1 except that the shape of the opening 110 is slightly different. In this regard, the opening 110 of FIG. 7 has only two lips 116 and one notch 114. Such a frame 101 may be used to scrape debris from a shovel positioned right-side up, as described herein, among other possible positions and tools.

In the exemplary embodiment shown by FIG. 7, the shape of the opening 110 corresponds to the shape of the blade 200 such that a substantial upper-side portion of the blade 200 contacts the inner wall 112 if the upper portion of the blade 200 is pushed against the lips 116. Likewise, the shape of the opening 110 corresponds to the shape of the blade 200 such that a substantial underside portion of the blade 200 contacts the inner wall 112 if the underside portion of the blade 200 is pushed against a lower lip 120. In FIG. 7, the lips 116 and 120 are shaped such that the opening 110 defines a curved slot where the curvature of the slot substantially matches that of the blade 200 inserted through the opening 110.

Note that each of the scrapers 100 of FIGS. 1 and 7 has a top edge 120 and two substantially parallel edges 121, although it is possible for the edges 121 to be non-parallel in other embodiments. Further, each of the edges 122 extends between the top edge 120 and a respective one of the parallel side edges 121. The corners 123 at the ends of the edges 122 are generally rounded. A user may scrape a tool against any of the edges 120-122 to scrape debris from the tool. For example, a user may press a tool blade against any of the edges 120-122 and move the tool blade past such edge while pressing the blade against the edge 120-122 such that a front face 111 or back face 112 of the scraper 100 pushes debris from the blade similar to how the faces 111 or 112 may push debris from a blade as it is being inserted into or removed from the opening 110.

Figure 8:
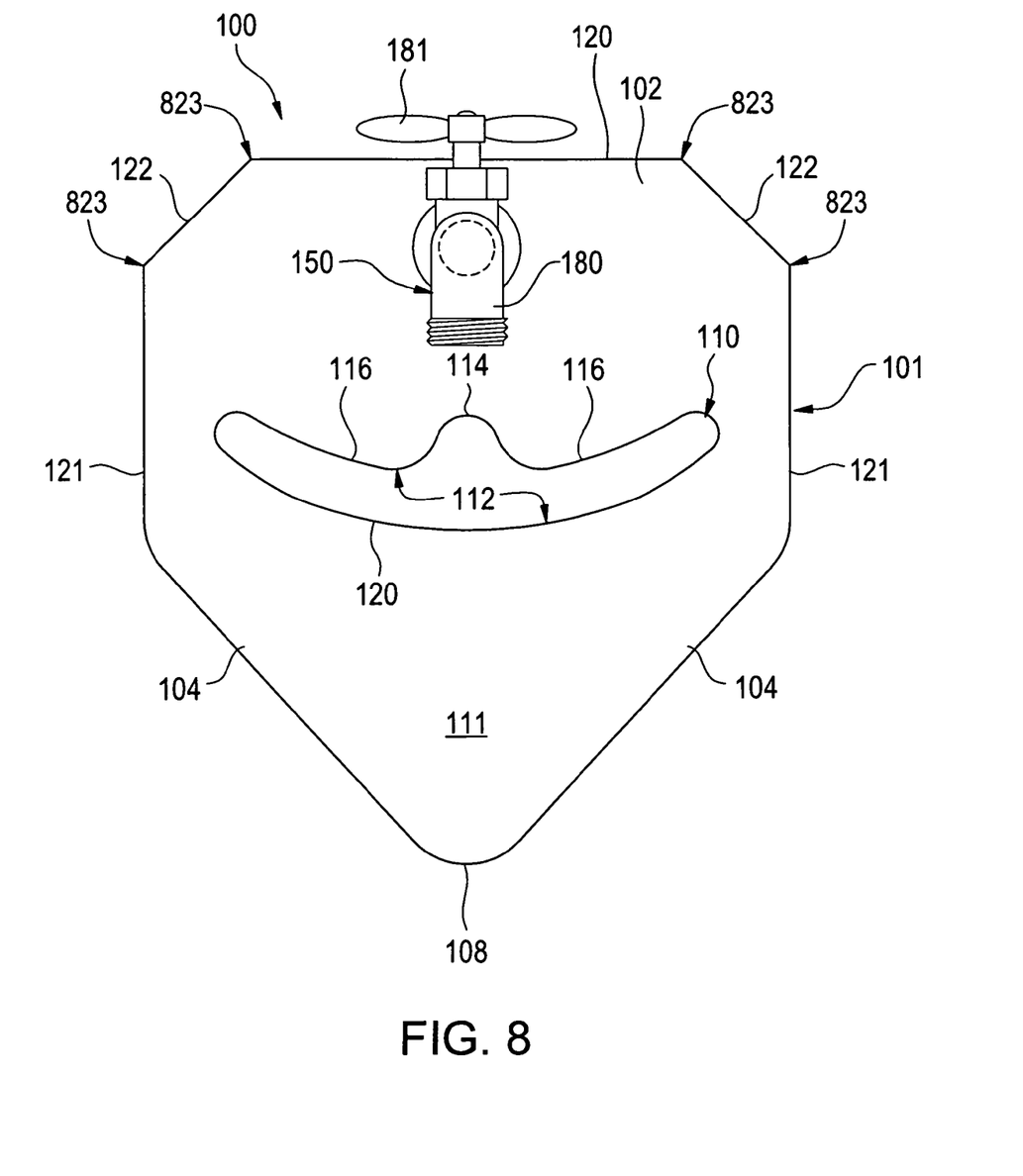
FIG. 8 depicts a tool scraper in accordance with an exemplary embodiment of the present disclosure.
Figure 9:
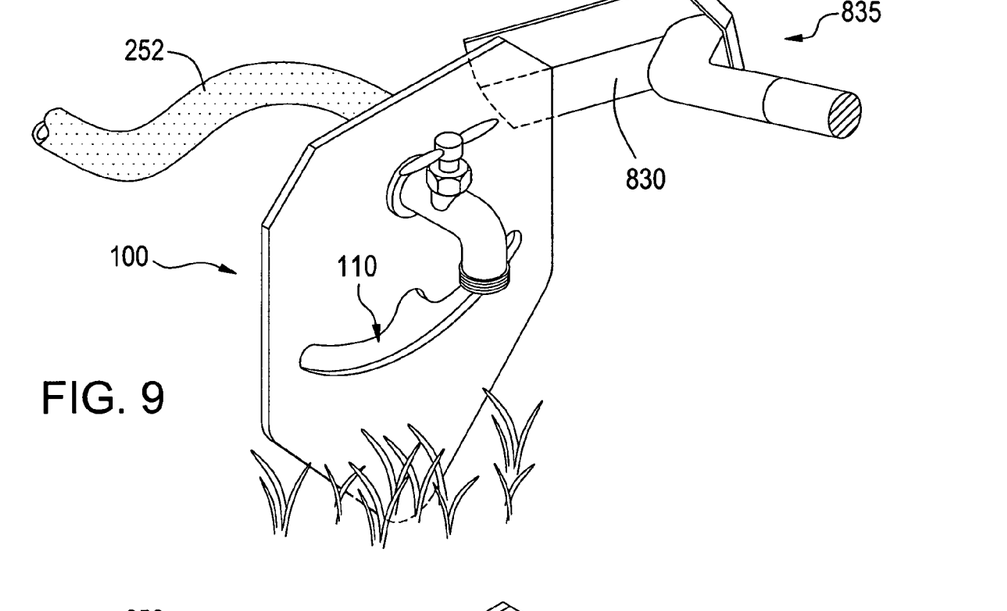
FIG. 9 depicts a tool scraper, such as is depicted in FIG. 8, being used to scrape a blade surface of a V-shaped landscape shovel.

For some tools, such as a V-shaped landscape shovel, scraping may be facilitated by configuring the scraper 100 with sharp corners 823, as shown in FIG. 8, in lieu of the rounded corners 123 of FIGS. 1 and 7. FIG. 9 shows a blade 830 of a V-shaped landscape shovel 835 being pressed against edges 122 and 121 of the scraper 100 depicted in FIG. 8. In one exemplary embodiment, the angle of the corner 823 contacting the blade 830 substantially matches the angle of the blade 830 so that each edge 122 and 121 can fit snugly against the surface of the blade 830.

Figure 10:
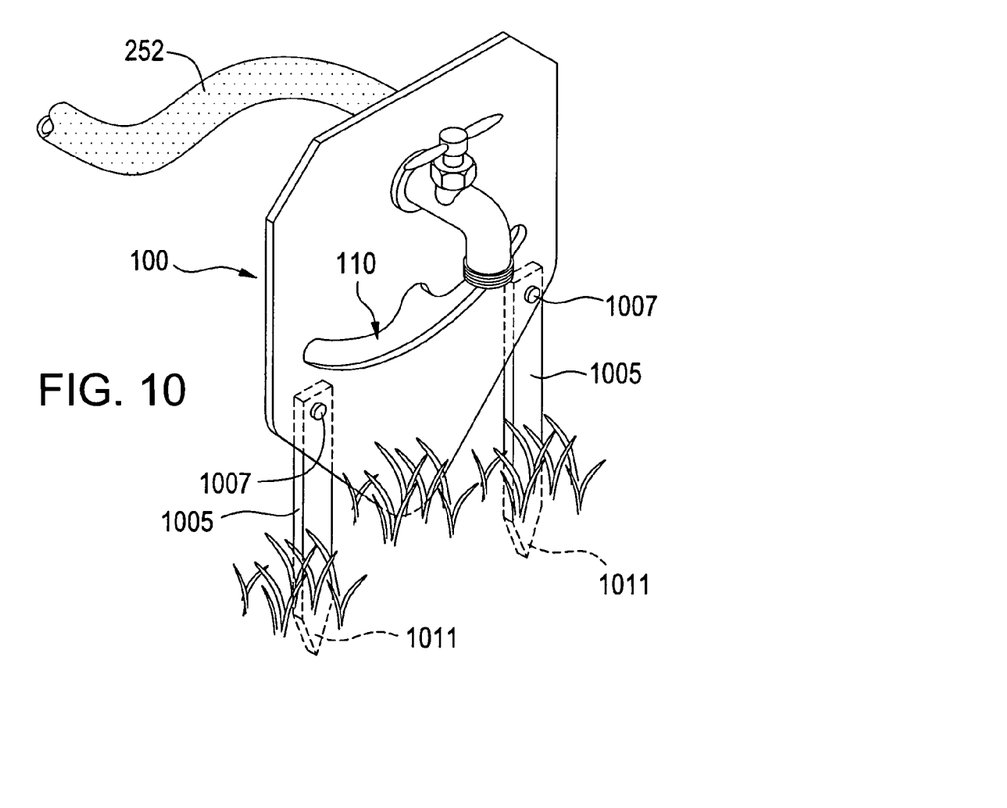
FIG. 10 depicts a tool scraper in accordance with an exemplary embodiment of the present disclosure.

As shown by FIG. 10, at least one stake 1005 can be used to help secure the scraper 100 to the ground or a structure. Each of the exemplary stakes 1005 shown in FIG. 10 contacts a back face 112 of the scraper 100, and a coupler 1007, such as a screw or bolt, passes through the stake 1005 and the scraper 100 in order to secure the stake 1005 to the scraper 100. Further, each stake 1005 has a tapered end 1011 for facilitating insertion of the stake 1005 into the ground or a structure (not shown).

Figure 11:
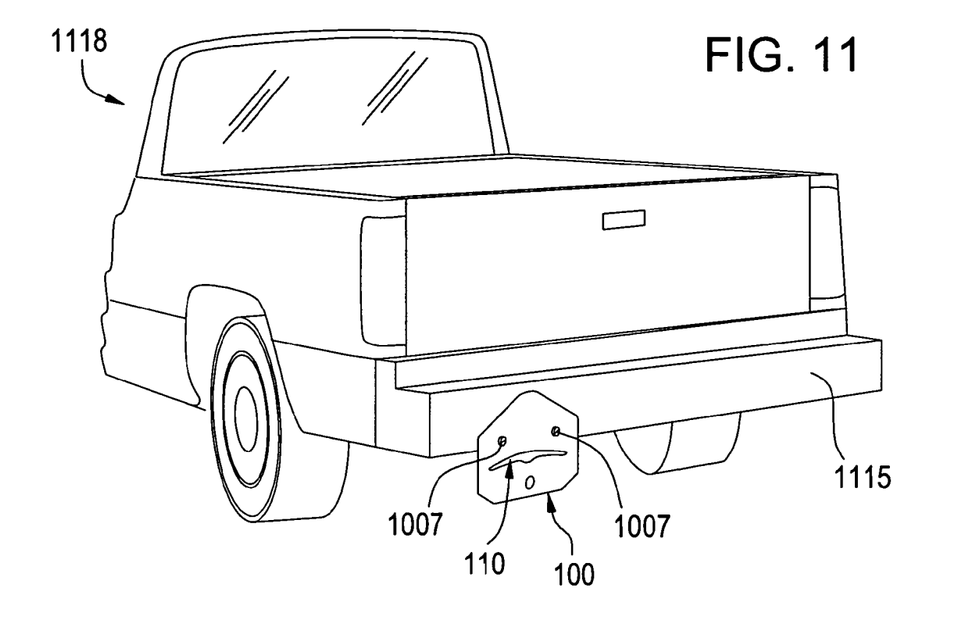
FIG. 11, depicts a tool scraper, such as is depicted in FIG. 10, mounted on a vehicle.

If desired, the coupler 1007 may be used to secure the scraper 100 to a vehicle or other structure rather than a stake 1005. For example, FIG. 11 depicts an exemplary scraper 100 through which couplers 1007 secure the scraper 100 to a bumper 1115 of a vehicle 1118. A user may use the scraper 100, as described herein, to scrape debris from a tool before placing the tool in the vehicle 1118 or at other times, as desired. The scraper 100 may be mounted on other portions of the vehicle 1118 or on other structures in other embodiments. Moreover, by placing the scraper 100 such that the opening 110 is below the bumper 1115 of the vehicle 1118 depicted in FIG. 10, a tool should not contact the vehicle 1118 when inserted through the opening 110 helping to prevent the vehicle 1118 from being damaged by the tool.

Note that the faucet 150 can be removed from the frame 101 before attaching the scraper 100 to the vehicle 1118. FIG. 11 depicts an example in which the faucet 150 has been so removed. However, in other examples, the faucet 150 may remain on the frame 101 when the scraper 100 is attached to the vehicle 1118 or other structure.

Figure 12:
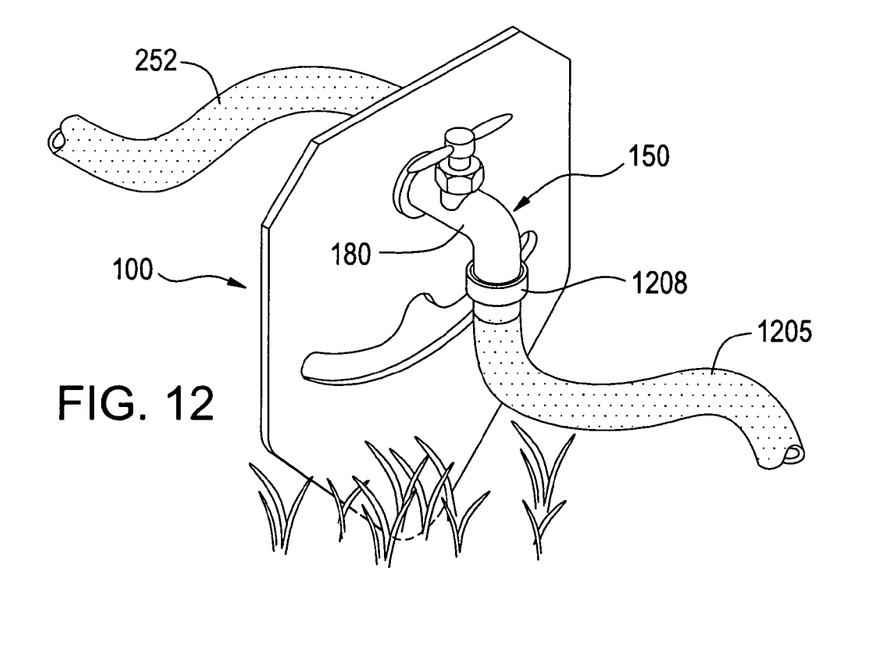
FIG. 12 depicts a tool scraper, such as is depicted in FIG. 8, attached to an additional hose.

FIG. 12 shows an exemplary scraper 100 having a faucet 150 that is coupled to an additional hose 1205 such that water from the faucet passes through the hose 1205. In this regard, an end of the hose 1205 has a hose connector 1208 that is threadedly attached to an end of the spout 180, which is threaded. In the example shown by FIG. 12, the scraper 100 can serve as an interface between hoses 1205 and 252 so that water or other liquids can be applied to areas that are out of reach of hose 252. Alternatively, water from the hose 1205 may be sprayed on the tool from which debris is being removed by the scraper 100. In such an example, the hose 1205 gives the user flexibility in where water is to be directed before, during, and/or after scraping.

Figure 13:
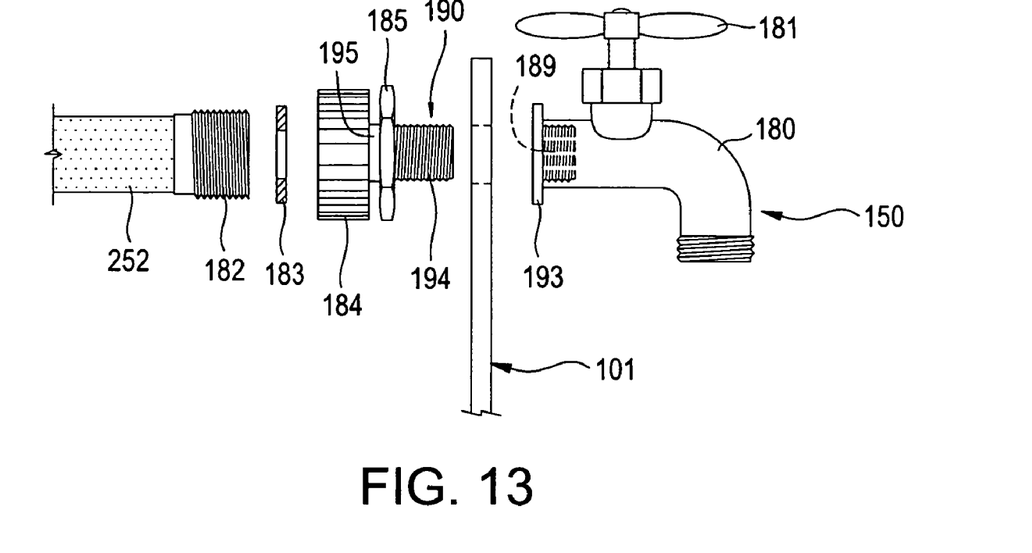
FIG. 13 depicts an exemplary embodiment of a tool scraper, such as is depicted in FIG. 8, before a fitting is inserted through a frame of the tool scraper.
Figure 14:
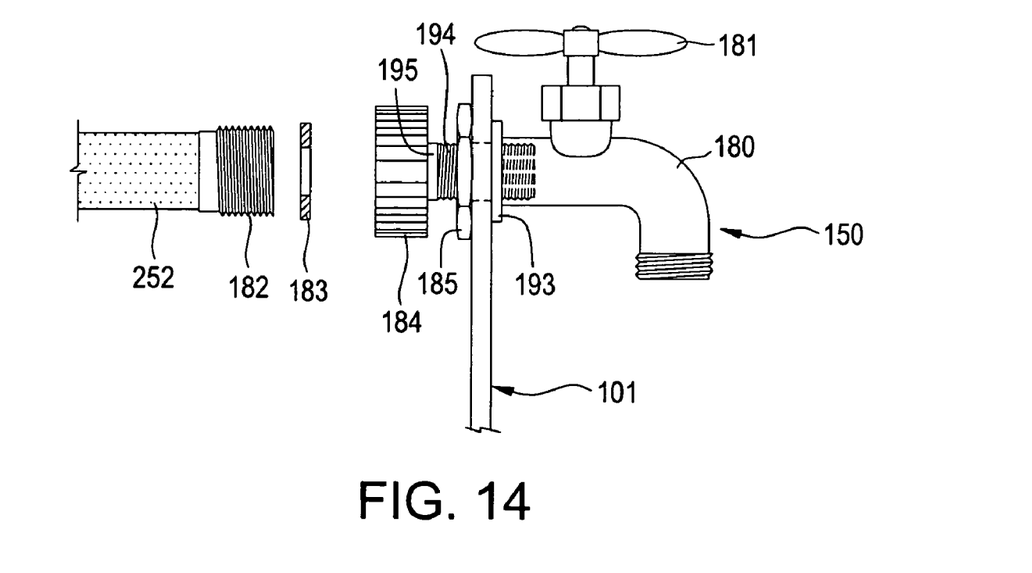
FIG. 14 depicts the tool scraper of FIG. 13 after the fitting has been inserted through the frame and into a spout.
Figure 15:
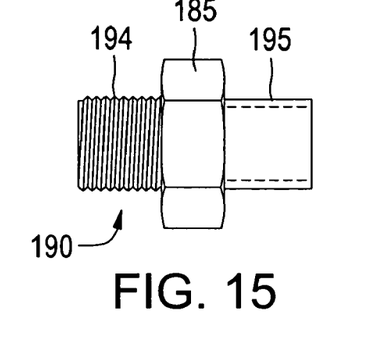
FIG. 15 depicts a fitting and a nut, such as is depicted in FIGS. 13 and 14.

FIGS. 13 and 14 illustrate an exemplary arrangement of the faucet 150 and other components for connecting the faucet to the hose 252. The arrangement of FIG. 13 is similar to that of FIG. 3. In this regard, the arrangement of FIG. 13 comprises a faucet 150, a nut 185, a connector 184, and a washer 183. The arrangement also comprises a hollow fitting 190. One end 194 of the fitting 190 is threaded. The other end 195 of the fitting 190 can be threaded, if desired, but in the embodiment depicted by FIG. 13, the end 195 is unthreaded. FIG. 15 illustrates the fitting 190 and nut 185 in more detail.

An interior of the connector 184 is threaded to allow the connector 184 to be threadedly attached to a threaded end 182 of the hose 252. In addition, an interior region 189 of the spout 180 is threaded. As illustrated by FIG. 14, the threaded fitting 190 is inserted through a hole in the frame 101 and into the spout 180. The threaded fitting 190 is rotated with respect to the spout 180 in order to threadedly attach the fitting 190 to the spout 180. In addition, the nut 185 is rotated with respect to the fitting 190 until the nut 185 and a flange 193 of the spout 180 fit snugly against the frame 101 thereby securing the faucet 150 to the frame 101, as depicted by FIG. 14.

Figure 16:
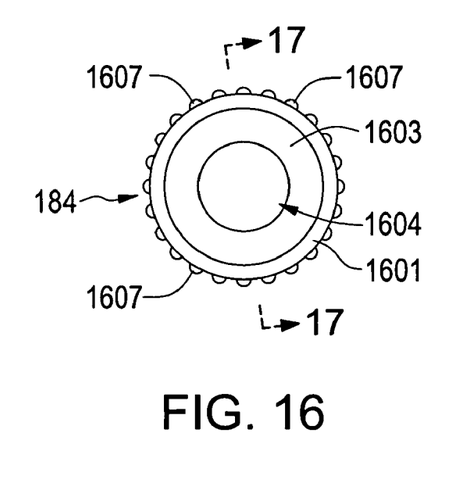
FIG. 16 depicts a hose connector, such as is depicted in FIGS. 13 and 14.
Figure 17:
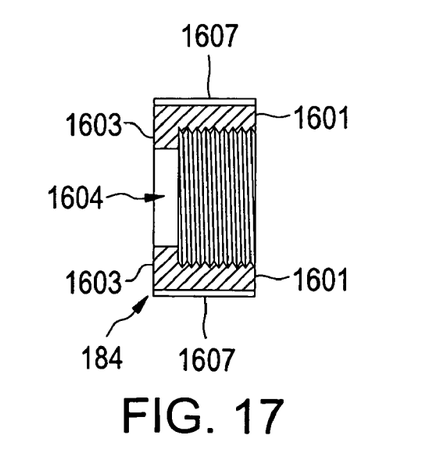
FIG. 17 depicts a cross-sectional view of the hose connector depicted in FIG. 16.

FIG. 16 illustrates a view of the connector 184 from the perspective of the hose 252 of FIG. 13. The connector 184 has a side wall 1601 that is generally in the shape of a cylinder, and the connector 184 has a face 1603 at one end. The face 1603 and wall 1601 may be formed as a single unitary structure or otherwise. The face 1603 has a hole 1604 dimensioned such that the end 195 of the fitting 190 depicted in FIG. 15 can fit therethrough. In addition, the exterior of the wall 1601 has a plurality of ribs 1607 for facilitating rotation of the connector 184 by hand. As shown by FIG. 17, an interior of the wall 1601 is threaded to allow the connector 184 to be threadedly attached to the hose 252.

In one exemplary embodiment, the fitting 190 is composed of copper, and the connector 184 is composed of plastic, although other materials for either the fitting 190 or the connector 184 can be used in other embodiments. There are various techniques that can be used to secure the fitting 190 to the connector 184. One exemplary method for securing the fitting 190 and the connector 184 will now be described hereinbelow.

Figure 18:
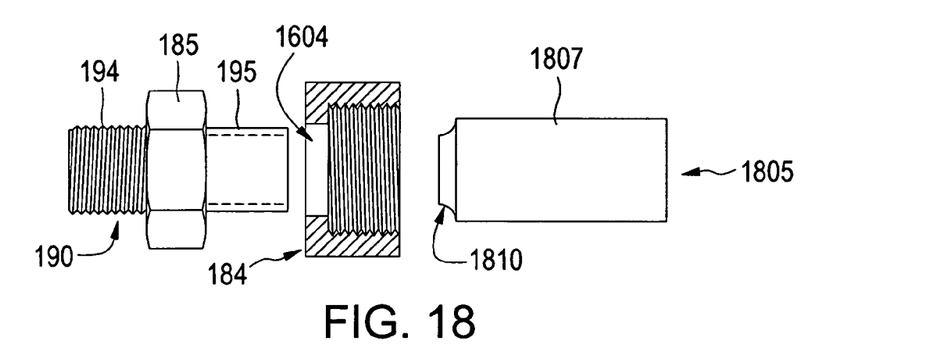
FIG. 18 depicts an exemplary arrangement of the fitting of FIG. 15, the hose connector of FIG. 17, and a forming tool before the fitting and forming tool are inserted into the hose connector.
Figures 19, 21:
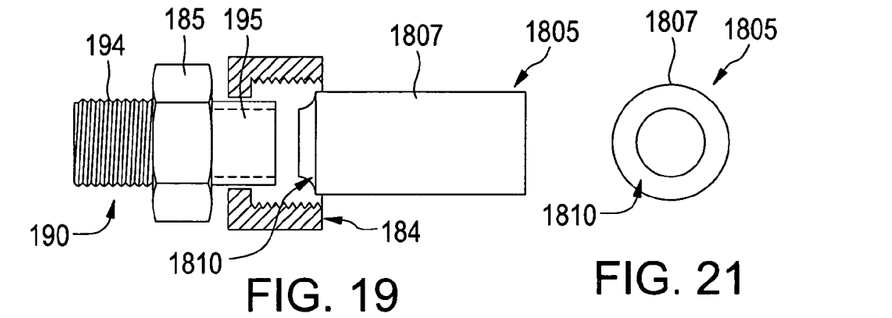
FIG. 19 depicts the arrangement of FIG. 18 after the fitting and forming tool have been inserted into the hose connector.
FIG. 21 depicts the forming tool of FIGS. 18 and 19.
Figure 20:
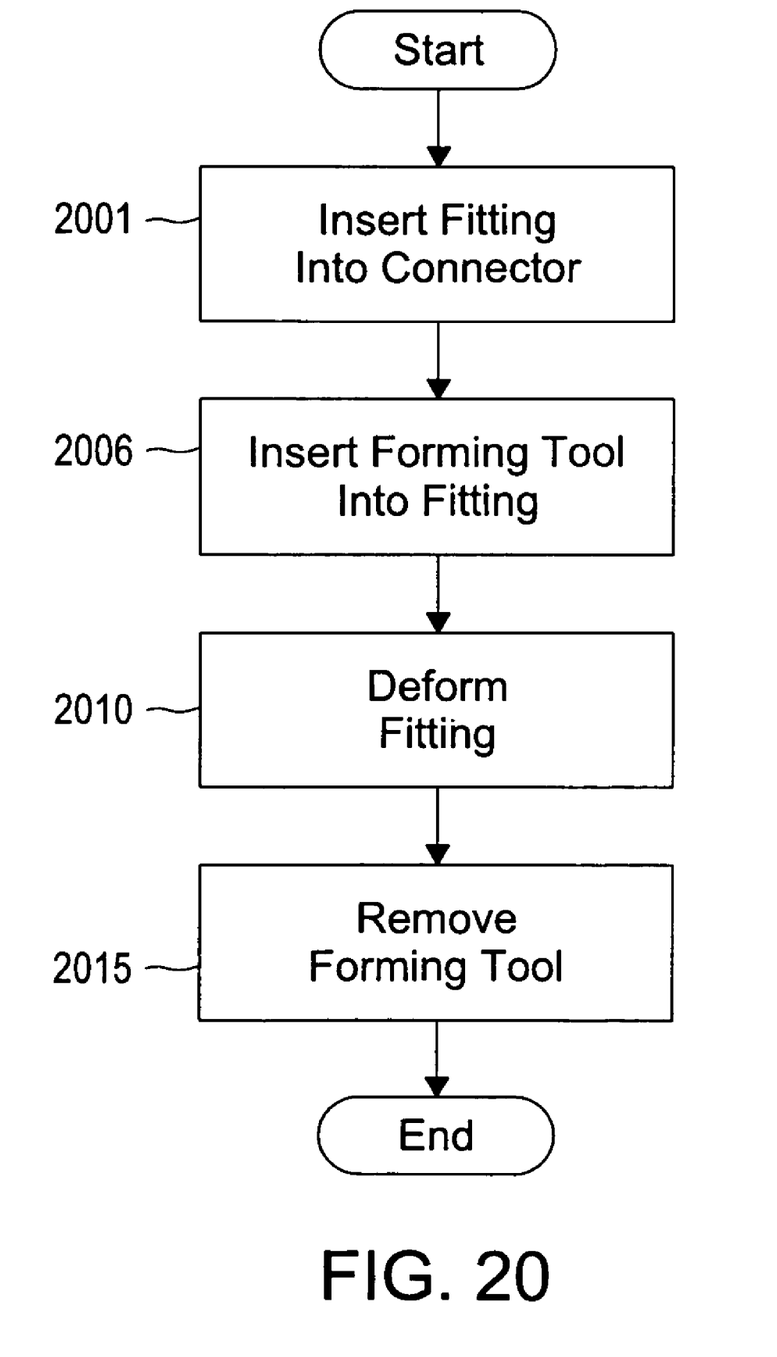
FIG. 20 depicts a flowchart illustrating an exemplary method for securing a fitting and hose connector, such as is depicted by FIGS. 18 and 19.

Referring to FIGS. 18 and 19, the end 195 of fitting 190 is inserted into the connector 184 through the hole 1604, as shown by block 2001 of FIG. 20. A forming tool 1805 is used to deform the fitting end 195. In this regard, the forming tool 1805 is generally shaped as a cylinder and is composed of steel or some other high strength material. FIG. 21 depicts a view of the forming tool 1805 from the perspective of the fitting 190. As depicted by FIGS. 19 and 21, a body 1807 of the forming tool 1805 has a diameter larger than the exterior diameter of the fitting end 195. However, an end 1810 of the tool 1805 is tapered so that it has a diameter less than an interior diameter of the fitting end 195. Accordingly, at least a portion of the tapered end 1810 of the forming tool 1805 can fit into the fitting end 195.

Figure 22:
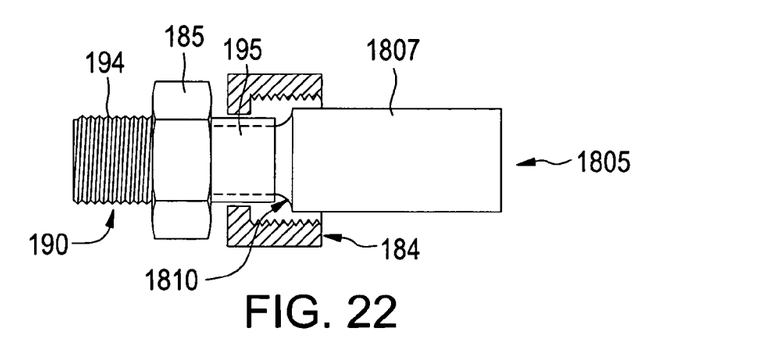
FIG. 22 depicts the arrangement of FIG. 19 after the forming tool has penetrated the fitting.
Figure 23:
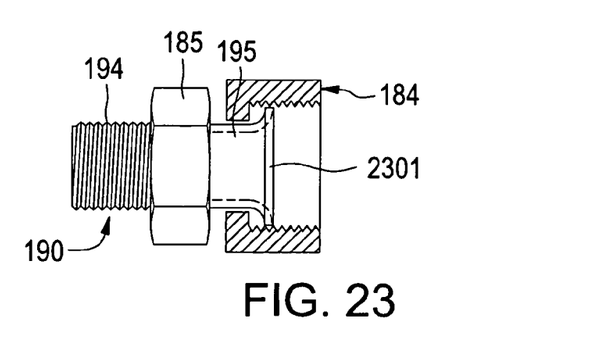
FIG. 23 depicts the arrangement of FIG. 22 after the forming tool has been withdrawn from the fitting and hose connector.

As illustrated by FIG. 19, the tapered end 1810 of the forming tool 1805 is inserted into the end of the connector 184 opposite of the hole 1604 through which the fitting end 195 is inserted. Insertion of the forming tool 1805 is continued so that the tapered end 1810 of the tool 1805 penetrates the fitting end 195, as depicted by FIG. 22 and block 2006 of FIG. 20. Due to the tapered nature of the end 1801, the diameter of the tapered end 1810 being inserted into the fitting end 195 gradually increases as the tool 1805 is gradually pushed toward the fitting 190.

At some point, the diameter of the tapered end 1810 that is being inserted into the fitting end 195 reaches the interior diameter of the fitting end 195. At this point, the tapered end 1810 of the forming tool 1805 should be flush with the interior region of the fitting end 195. Movement of the tool 1805 into the fitting end 195 is continued causing the fitting end 195 to deform as the diameter of the tapered end 1810 being inserted into the end 195 continues to increase, as shown by block 2010 of FIG. 20. In this regard, deformation of the fitting end 195 forms a lip 2301, as depicted by FIG. 22, that has an exterior diameter greater than the diameter of the hole 1604. Note that a vise (not shown) or some other tool may be used to facilitate insertion of the forming tool end 1810 into the fitting end 195 as described.

At some point after the exterior diameter of the lip 2301 exceeds the diameter of the hole 1604 (e.g., after the body 1807 reaches the fitting 190), the forming tool 1805 is removed by withdrawing the tool 1805 from the fitting end 195 and connector 184, as shown by block 2015 of FIG. 20. Since the exterior diameter of the lip 2301 is larger than the diameter of the hole 1604, the lip 2301 cannot fit through the hole 1604, and the fitting 190, therefore, is secured to the connector 184. Moreover, once the hose 252 is threadedly coupled to the connector 184, liquid from the hose 252 can flow through the fitting 190 to the spout 180 (FIG. 14).

As can be seen in the various embodiments described above, various configurations and uses of a scraper 100 in accordance with the present disclosure are possible. Moreover, other configurations, including other shapes, of the scraper 100 are possible and would be apparent to one of ordinary skill in the art upon reading this disclosure.

Now, therefore, the following is claimed:

1. An apparatus for removing debris from a garden tool having a blade, comprising:
   a flat one-piece frame having an opening in a portion of the frame, the opening dimensioned to receive the blade of the tool, the frame comprising a blunt point contiguous with the portion of the frame having the opening, the blunt point for insertion into the ground such that the opening remains exposed; and
   a spout coupled to the frame, the spout positioned above the opening so that water from the spout flows onto the tool thereby cleaning the tool wherein the opening comprises at least two arc-shaped lips; and a notch interposed between the at least two arc-shaped lips.

2. The apparatus of claim 1, wherein the opening has a shape corresponding with a cross-sectional shape of a blade of the tool.

3. The apparatus of claim 1, wherein the frame has a tapered end.

4. The apparatus of claim 1, wherein the spout comprises a threaded extension inserted into an opening in the frame.

5. The apparatus of claim 1, wherein the frame is adapted for mounting on a vehicle.

6. The apparatus of claim 1, further comprising a stake coupled to the frame.

7. The apparatus of claim 1, wherein the at least two lips having a radius of curvature matching a radius of curvature of the blade.

8. The apparatus of claim 1, further comprising:
   a threaded connector having a hole; and
   a hollow fitting passing through the frame and inserted into the spout, the hollow fitting passing through the hole and having a deformed end forming a lip, the lip having a diameter greater than a diameter of the hole.

9. An apparatus for removing debris from a garden tool having a blade, comprising:
   a one-piece substantially flat frame having an opening for receiving the tool and a blunt point for insertion into the ground; and
   a spout coupled to the frame above the opening, the spout positioned such that liquid from the spout contacts the tool as the tool is passing through the opening, wherein the opening comprises at least two arc-shaped lips; and a notch interposed between the at least two arc-shaped lips.

10. The apparatus of claim 9, wherein the opening has a shape corresponding with a cross-sectional shape of a blade of the tool.

11. The apparatus of claim 9, wherein the frame has a tapered end.

12. The apparatus of claim 9, wherein the spout is connected to a hose.

13. The apparatus of claim 9, wherein the frame is adapted for mounting on a vehicle.

14. The apparatus of claim 9, further comprising:
a threaded connector having a hole; and
a hollow fitting passing through the frame and inserted into the spout, the hollow fitting passing through the hole and having a deformed end forming a lip, the lip having a diameter greater than a diameter of the hole.

\* \* \* \* \*